United States Patent [19]
Nakagawa et al.

[11] Patent Number: 5,645,961
[45] Date of Patent: Jul. 8, 1997

[54] ZINC ANODE CAN OF A BATTERY, METHOD OF MANUFACTURE THEREOF, AND MANGANESE DRY BATTERY USING SUCH ZINC CAN PREPARED BY SUCH METHOD

[75] Inventors: Yoshiteru Nakagawa; Shinji Nittono; Takaaki Yasumura, all of Kosai; Chihiro Murata, Toyohashi; Kazuo Matsui, Toyohashi; Kuniyoshi Nishida, Toyohashi; Mitsuo Murakoshi, Hamana-gun; Akihide Izumi, Kosai, all of Japan

[73] Assignee: FDK Corporation, Tokyo, Japan

[21] Appl. No.: 564,233

[22] PCT Filed: Apr. 27, 1995

[86] PCT No.: PCT/JP95/00845

§ 371 Date: Dec. 21, 1995

§ 102(e) Date: Dec. 21, 1995

[87] PCT Pub. No.: WO95/29510

PCT Pub. Date: Nov. 2, 1995

[30] Foreign Application Priority Data

| Apr. 27, 1994 | [JP] | Japan | 6-089674 |
| Apr. 27, 1994 | [JP] | Japan | 6-089675 |
| Apr. 24, 1995 | [JP] | Japan | 5-098864 |

[51] Int. Cl.[6] ................................ H01M 4/02
[52] U.S. Cl. .................. 429/229; 429/176; 429/247
[58] Field of Search ........................ 429/218, 223, 429/229, 233, 247, 198, 163, 176, 148

[56] References Cited

FOREIGN PATENT DOCUMENTS

| 33-3204 | 4/1933 | Japan . |
| 59-60860 | 4/1984 | Japan . |
| 61-224265 | 10/1986 | Japan . |
| 4-53073 | 8/1992 | Japan . |
| 5-47364 | 2/1993 | Japan . |
| 5-159786 | 6/1993 | Japan . |
| 5-159775 | 6/1993 | Japan . |
| 6-20689 | 1/1994 | Japan . |
| 6-20674 | 1/1994 | Japan . |
| 6-20686 | 1/1994 | Japan . |
| 338314 | 6/1994 | Japan . |
| 6-163019 | 6/1994 | Japan . |
| 6-302323 | 10/1994 | Japan . |

*Primary Examiner*—M. Nuzzolillo
*Attorney, Agent, or Firm*—Wenderoth, Lind & Ponack

[57] ABSTRACT

A zinc anode can is formed of a zinc based alloy material including 0.004–0.800 wt % of indium, 0.001–0.25 wt % of titanium or 0.002–0.500 wt % of zirconium, without containing significant amounts of harmful substances such as mercury, cadmium, or lead, is provided. A method of manufacturing of such zinc anode can enabling addition of up to 0.800 wt % of indium includes hot rolling of the zinc base alloy in a temperature range of 270–370° C. A manganese dry battery includes a separator on which is coated a paste having 0.1–8 wt % of $InCl_3$. The separator is disposed on the inner surface of the zinc can. An interior of the separator is filled with a cathode mixture containing conductive carbonaceous material such as manganese dioxide, and acetylene black and electrolyte with a $ZnCl_2$ concentration of 35–50 wt %. A carbon rod as a collector is inserted into the center of the cathode mixture.

12 Claims, 2 Drawing Sheets

CRACKING CAUSED IN A ROLLING STEP

ROLLING DIRECTION

ZINC ANODE CAN OF A BATTERY, METHOD OF MANUFACTURE THEREOF, AND MANGANESE DRY BATTERY USING SUCH ZINC CAN PREPARED BY SUCH METHOD

BACKGROUND OF THE INVENTION

This invention relates to a zinc anode can for a battery, such can being formed into the shape of hollow cylinder with one end closed, and a manufacturing method therefor, and a manganese dry battery employing such zinc can, particularly to a technique enabling a zinc anode can of high performance and a manganese dry battery using the same without adding harmful substances such as mercury, cadmium and lead thereto. As employed herein, the term zinc anode can refers to a can-shaped member to contain an electrolyte, to form an anode of a battery, and formed of a zinc base alloy.

As is well known, a zinc anode can used for a manganese battery is manufactured through the following series of steps.

① A light amount of appropriate metal, mentioned below, is added to zinc and is melted therewith to form a zinc base alloy.

② Such melted zinc base alloy is cast continuously to obtain a continuous band-shaped sheet.

③ Such band-shaped sheet, which was case continuously, is successively hot rolled at a temperature within a range of 200°–250° C. to obtain a plate-shaped sheet of a predetermined thickness.

④ The thus rolled plate-shaped sheet is punched to obtain pellets of predetermined shape and dimension, such as round or hexagonal discs.

⑤ Each pellet is pressed in a die and pressed by a punch impulsively to form a hollow cylinder with one end closed. (Impact backward extrusion method)

⑥ An open portion of the hollow cylinder is cut away to adjust the height of the thus formed cylindrical zinc anode can.

Taking a zinc anode can for a R20 type manganese battery as an example, the thickness of the plate may be arranged to be approximately 5.2 mm at the rolling step ③. Then, round pellets of 30 mm diameter are punched out at the punching step ④, and the pellets are formed into hollow cylinders with one end closed, each having an outer diameter of 31.4 mm and thickness of 0.5 mm at the forming step ⑤. The height of the cylindrical can may be adjusted to 53.5 mm at the cutting step ⑥.

If the workability of the material for rolling or deformation processing (ductility) is not sufficient during the continuous hot rolling step ③ and the forming step ⑤ by the impact backward extrusion method, the material may suffer from cracks, burrs and so on, and successive working of the material will be interrupted. It is a basic and essential factor that the cylindrical cans are able to be formed at a high yield without causing defects such as cracks. (This is referred to as workability).

Finished zinc anode cans are carried to a battery assembly line, where a cathode, a separator and electrolyte are installed into the can. Then, the can is sealed with a cathode terminal and a gasket fixed to an opening of the can. When mechanical durability of the zinc can is too low at this stage, the can may be deformed during or after the battery assembly operation, thus causing various defects. Therefore, the finished zinc cans are required to have a certain mechanical strength. However, improvement in mechanical strength instead may deteriorate the above plastic workability (ductility), and vice versa.

A zinc anode can usually contacts the electrolyte contained therein in assembled batteries. Therefore, the zinc can must have sufficient corrosion resistance against the electrolyte in order to prevent self-discharge during storage of the batteries.

As required above, a zinc anode can of a battery is required to have characteristics such as plastic workability, mechanical strength after being finished as a can and corrosion resistance against the electrolyte. These characteristics relate not only to the composition of the zinc base alloy, but also to such factors of the manufacturing process as melting temperature at the melting step ①, die temperature at the molding step ②, temperature and reduction ratio at the rolling step ③, temperature at the punching step ④ for preparing pellets, temperature and workability ratio at the can forming step ⑤. (These factors are referred to as process factors.) Temperatures as process factors are specifically controlled to be maintained within 200°–250° C.

For the purpose of improving the above mentioned characteristics such as workability, mechanical strength, corrosion resistance, existing manganese batteries employ an anode formed of a zinc base alloy including approximately 0.15 wt % lead and approximately 0.05 wt % cadmium. As is well known, however, under the technical policy of avoiding as much as possible the use of harmful substances in the components of batteries, mercury was rejected first and then usage of cadmium was abolished. In summary, technical innovation seeks to employ metal additives of significant effect of improving characteristics and at the same time not deteriorating battery performance. (For example, see Japanese Patent Laid-open Publication No. 61-273861, Japanese Patent Publication No. 4-30712, Japanese Patent Laid-open Publication No. 4-198441, etc.).

However, even if recent manganese batteries, the zinc anode cans still include approximately 0.4 wt % of lead. It is the next technical target to avoid addition of lead.

In view of the above mentioned circumstances, in contrast to the existing zinc anode can of good characteristics but containing 0.4 wt % of lead, pure zinc cans were experimentally made for comparison and evaluation.

Zinc cans were made from base metal of zinc with zinc purity of 99.9986 wt % through the above-mentioned manufacturing process without addition of other metals. Experimental production of the cans were repeatedly performed while the process factors (melting temperature at the melting step ①, die temperature at the molding step ②, temperature and reduction ratio at the rolling step ③, temperature at the punching step ④ for preparing pellets, temperature and workability ratio at the can forming step ⑤) were varied. Accordingly, experimental products of different process factors were made without departing from the essential requirement (plastic workability) that cans without defect can be manufactured efficiently. Mechanical strength as a finished can and corrosion resistance to the electrolyte were examined for each can under the conditions below and the results were compared to those of the conventional products. (Comparison tests were performed on zinc anode cans for R20 type manganese batteries.)

(a) Sample pieces of 20 mm square were taken from a central portion of side walls of the formed cans. Vickers' hardness (Hv) of the sample pieces was measured at five (5) points for each piece, then the average value of the measured values for ten sample pieces was obtained. The average value was considered to be an evaluation of mechanical strength.

(b) For evaluation of corrosion resistance, sample pieces of 10 mm square obtained in the same manner were soaked in electrolyte for a certain period, then loss by corrosion was measured. The average value of the weight loss among ten (10) sample pieces was obtained. The electrolyte was a water solution of a pH of 4.7, consisting of $ZnCl_2$ (26.4 wt %) and $NH_4Cl$ (2.2 wt %). The sample pieces were left in the electrolyte at 45° C. for twenty (20) days.

As a result of the tests, the greatest hardness of the experimental products of pure zinc was Hv37, while hardness of the conventional products to which lead was added was Hv45. The least loss by corrosion of the trial products of pure zinc was 9.5 mg/cm$^2$. With respect to hardness, the experimental products of pure zinc were not significantly inferior to the conventional products. However, the experimental products were very poor with respect to loss by corrosion. This result will prove the significant effect of addition of lead.

Next, the same zinc anode cans for R20 type manganese batteries as the preceding example were produced with zinc base alloy comprising pure zinc and additionally a small amount of indium through the above-described process. Vickers' hardness and loss by corrosion were measured by the same methods (a) and (b). The results have shown that a trial product containing 0.0010 wt % of indium had a hardness of Hv39.5 and loss by corrosion of 8.02 mg/cm$^2$. These results were better than those of the above pure zinc cans. However, the cans to which this degree of indium was added were evaluated to be significantly inferior to the existing products, specifically with respect to loss by corrosion.

In view of this result, products containing more indium of 0.0040 wt % and 0.0100 wt % were prepared experimentally. In such case, workability of rolling of the material, i.e. the zinc base alloy containing indium, was so lowered that normal rolling could not be performed at the hot rolling step ③ and the material was broken into pieces.

This invention was made based on the aforesaid knowledge, and the objective of the invention is to provide zinc anode cans having excellent corrosion resistance and mechanical strength without adding harmful substances from an environmental viewpoint such as lead, cadmium, mercury, a manufacturing method of the same, and manganese dry batteries employing the zinc cans produced thereby.

SUMMARY OF THE INVENTION

A zinc anode can of the present invention comprises a zinc based alloy containing 0.004–0.75 wt % of indium and 0.001–0.25 wt % of titanium, and at the same time without containing, or without containing a significant amount of, harmful substances such as mercury, cadmium and lead.

Alternatively, a zinc anode can of the present invention comprises a zinc base alloy containing 0.004–0.800 wt % of indium and 0.002–0.500 wt % of zirconium, and at the same time without containing, or without containing a significant amount of harmful substances such as mercury, cadmium and lead.

Preferably, the above zinc base alloy may further comprise a small amount of nickel, aluminum and silicon.

Furthermore, a method of manufacturing such zinc anode cans for dry batteries according to the present invention includes the steps of melting zinc material, and subjecting such material to casting, hot rolling, punching to form pellets, and impact extruding. The method is characterized in that the zinc material is a zinc base alloy containing 0.004–0.75 wt % of indium and 0.001–0.25 wt % of titanium, without containing, or without containing a significant amount of harmful substances such as mercury, cadmium and lead, and that the hot rolling step is performed in a temperature range of 270°–370° C.

Another method according to the present invention is characterized in that zinc base alloy contains 0.004–0.800 wt % of indium and 0.002–0.500 wt % of zirconium, without containing, or without containing a significant amount of, harmful substances such a mercury, cadmium and lead, and that the hot rolling step is performed in the temperature range of 270°–370° C.

Moreover, as described above, a manganese dry battery of the present invention comprises a zinc can employing zinc material including a zinc alloy which is formed by adding 0.004–0.75 wt % of In to pure zinc without adding harmful substances such as mercury, cadmium or lead, to which 0.001–0.25 wt % of Ti or 0.002–0.500 wt % of Zr is added. A separator on which paste having 0.1–8 wt % of $InCl_3$ is coated is disposed on the inner surface of the zinc can. The inside of the thus disposed separator is filled with a cathode mixture containing conductive carbonaceous material such as manganese dioxide, or acetylene black and electrolyte with a $ZnCl_2$ concentration of 35–50 wt %. A carbon rod is inserted into the center of the cathode mixture as a collector.

As is seen from results of a number of comparison tests described herebelow, with respect to the present invention, corrosion resistance is improved by adding indium to pure zinc, whereas rolling workability shows a tendency of deterioration. However, a decline of rolling workability can be prevented by including titanium or zirconium of the aforementioned quantities in addition to indium. In such case, the amount of indium to be added can be increased by performing hot rolling within the temperature range of 270°–370° C. Moreover, even when the amount of indium is further increased by including nickel, aluminum or silicon of the above-mentioned quantities and corrosion resistance is further improved, deterioration of rolling workability is suppressed. As a result, target values of hardness not less than Hv40 and loss by corrosion of not more than 7.0 mg/cm$^2$ can be achieved.

Indium contained in the paste is transferred to the surface of the zinc can by adding indium to the past on the separator contacting the zinc can. The transferred indium functions similarly to mercury and effectively suppresses corrosion of the zinc can, together with indium and titanium or zirconium included in the material composition of the zinc can. Furthermore, setting the $ZnCl_2$ concentration in the electrolyte within the range of 35–50 wt % promptly triggers the anti-corrosion effect of indium and rapidly stabilizes the interface condition of the anode zinc so as to stabilize an open-circuit voltage quickly during assembly of a battery.

DETAILED DESCRIPTION OF THE INVENTION

Pure zinc with zinc purity of 99.9986 wt % was taken as raw material (inevitably contained impurities were not taken into account). Then, small amounts of metal were added to the pure zinc according to the following rates, and zinc anode cans for R20 type manganese batteries were manufactured pursuant to the aforementioned manufacturing process. For each of the experimental products, Vickers' hardness (Hv) and corrosion resistance (mg/cm$^2$) were measured according to the methods (a) and (b) precisely described above. At the same time, workability at the aforesaid hot rolling step ③ was evaluated as follows.

Figure 1:
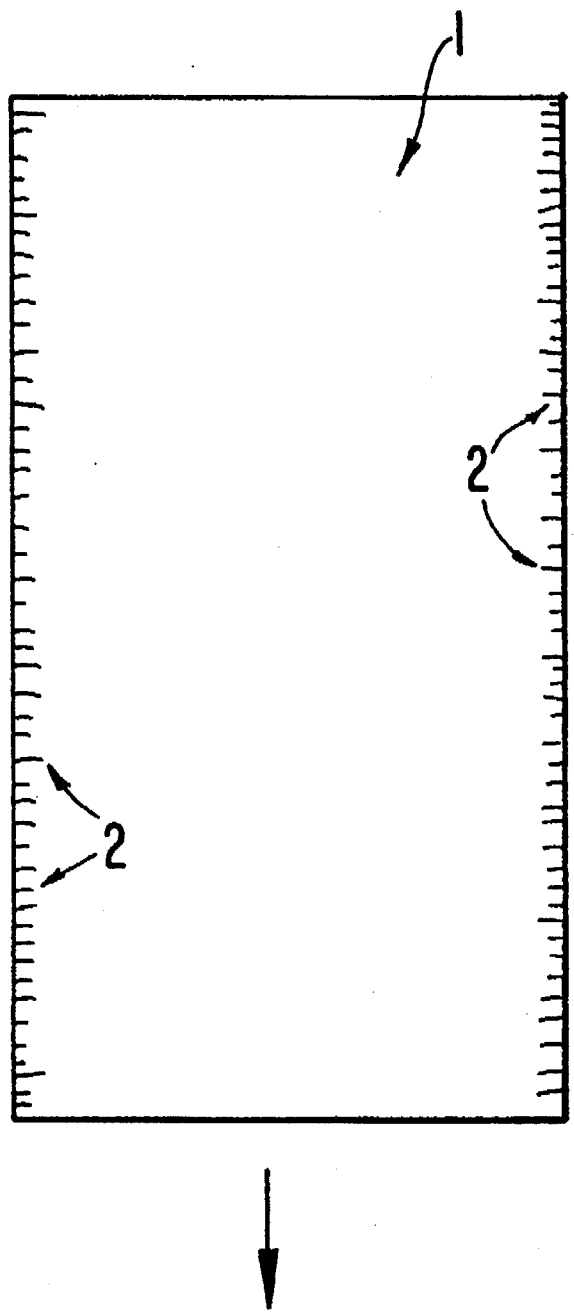
FIG. 1 is a schematic view showing cracks occurring during a hot rolling step.

At the hot rolling step ③, as shown in FIG. 1, a plate 1 being ten-some cm wide and about 5 mm thick is obtained. However, in case that rolling workability of the material is poor, cracks 2 occur at both side peripheries of the plate 1. It is safe to say that workability of the material becomes worse as the cracks 2 become longer and the number of cracks 2 increases. When workability of the material is extraordinarily poor as that of the aforesaid trial products containing much indium, the plate 1 cannot be formed further since the material is broken into pieces.

In a number of tables showing test examples hereinbelow, rolling workability is evaluated and indicated in five grades as follows.

| | |
|---|---|
| ○ | No crack occurs. Excellent. |
| ○/△ | Length of the cracks 2 is less than 1% of the width of the plate 1. Good. |
| △ | Length of the cracks 2 is less than 3% of the width of the plate 1. Fair. |
| △/X | Length of the cracks 2 is more than 3% of the width of the plate 1. Poor. |
| X | The material is broken into pieces. Unable to be rolled. |

TEST EXAMPLE 1

X wt % of In and 0.05 wt % of Ti were added to pure zinc.
Hot rolling temperature: 250° C.
Relation among added amount (wt %), hardness (Hv), loss by corrosion (mg/cm$^2$), and rolling workability is shown.

| In (wt %) | 0.0000 | 0.0040 | 0.0100 | 0.0500 | 0.2000 | 0.3000 | 0.5500 | 0.6500 |
|---|---|---|---|---|---|---|---|---|
| Hardness (Hv) | 43.1 | 43.2 | 43.2 | 43.4 | 43.2 | 43.2 | 43.1 | — |
| Loss by Corrosion | 8.21 | 5.21 | 2.89 | 1.92 | 1.83 | 1.65 | 1.45 | — |
| Workability | ○ | ○ | ○ | ○/△ | ○/△ | △ | △ | X |
| | | | | ← Practical Range → | | | | |

COMMENT ON TEST EXAMPLE 1

Corrosion resistance was improved by adding In. However, Ti was further added to prevent cracks at rolling. Addition of Ti also increased hardness.

TEST EXAMPLE 2

0.200 wt % of In and X wt % of Ti were added to pure zinc.

Hot rolling temperature: 250° C.

Relationship among added amount (wt %), hardness (Hv), loss by corrosion (mg/cm$^2$), and rolling workability is shown.

| Ti (wt %) | 0.0000 | 0.0010 | 0.0040 | 0.0100 | 0.0500 | 0.2000 | 0.2500 | 0.4000 |
|---|---|---|---|---|---|---|---|---|
| Hardness (Hv) | — | 41.1 | 41.3 | 42.4 | 43.2 | 44.2 | 45.1 | 46.1 |
| Loss by Corrosion | — | 1.30 | 1.53 | 1.79 | 1.83 | 4.81 | 6.12 | 8.31 |
| Workability | X | △ | ○/△ | ○/△ | ○/△ | ○ | ○ | ○ |
| | | | ← Practical Range → | | | | | |

COMMENT ON TEST EXAMPLE 2

Corrosion resistance was improved by adding In. Though addition of Ti reduced cracks at rolling, corrosion resistance was lowered outside the practical range.

In the above test examples 1 and 2, hot rolling temperature was set at the typical conventional value of 250° C. It was observed that workability was improved and the amount of In to be added could be increased when the hot rolling temperature was set higher than the conventional value.

Based on the above knowledge, rolling was performed while rolling temperature was employed as a parameter, on condition that 0.10 wt % of Ti was added to pure zinc and an amount of In was varied within the range of 0.65–0.80 wt %. The results are shown in the following test examples 3–5.

TEST EXAMPLE 3

0.65 wt % of In and 0.10 wt % of Ti were added to pure zinc.

Relationship among rolling temperature (° C.), hardness (Hv), loss by corrosion (mg/cm$^2$, and rolling workability is shown.

| Rolling temperature (°C.) | 200 | 250 | 270 | 300 | 350 | 370 | 400 |
|---|---|---|---|---|---|---|---|
| Hardness (Hv) | — | — | 43.7 | 43.7 | 43.8 | 43.7 | — |
| Loss by Corrosion | — | — | 1.61 | 1.56 | 1.51 | 1.51 | — |
| Workability | X | X | △ | O/△ | O | O/△ | X |
|  |  |  | \| | ← Practical → Range | | \| | |

TEST EXAMPLE 4

0.75 wt % of In and 0.10 wt % of Ti were added to pure zinc.

Relationship among rolling temperature (° C.), hardness (Hv), loss by corrosion (mg/cm$^2$), and rolling workability is shown.

| Rolling temperature (°C.) | 200 | 250 | 270 | 300 | 350 | 370 | 400 |
|---|---|---|---|---|---|---|---|
| Hardness (Hv) | — | — | 43.4 | 43.4 | 43.4 | 43.6 | — |
| Lose by Corrosion | — | — | 1.40 | 1.36 | 1.21 | 1.23 | — |
| Workability | X | X | △ | △ | O/△ | △ | X |
|  |  |  | \| | ← Practical → Range | | \| | |

TEST EXAMPLE 5

0.80 wt % of In and 0.10 wt % Ti were added to pure zinc.

Relationship among rolling temperature (° C.), hardness (Hv), loss by corrosion (mg/cm$^2$), and rolling workability is shown.

| Rolling temperature (°C.) | 200 | 250 | 270 | 300 | 350 | 370 | 400 |
|---|---|---|---|---|---|---|---|
| Hardness (Hv) | — | — | — | — | — | — | — |
| Loss by Corrosion | — | — | — | — | — | — | — |
| Workability | X | X | X | X | X | X | X |

As is apparent from the above test examples 3–5, the maximum added amount of In was 0.550 wt % (See test example 1.) at the hot rolling temperature of 250° C. However, when the hot rolling temperature was set between 270° C.–370° C., an added amount of In up to 0.75 wt % was practically effective for all the factors of workability, hardness, loss by corrosion.

The above test examples 3–5 show the results of tests in which 0.10 wt % of Ti was added and the In amount was varied between 0.65–0.80 wt % where the hot rolling temperature was higher than the conventional values. The following test examples 6 and 7 show test results at the hot rolling temperature of 350° C. for various In amounts below 0.750 wt % and for various added amounts of Ti.

TEST EXAMPLE 6

X wt % of In and 0.05 wt % of Ti were added to pure zinc.

Hot rolling temperature: 350° C.

Relationship among added amount (wt %), hardness (Hv), loss by corrosion (mg/cm$^2$), and rolling workability is shown.

| In (wt %) | 0.000 | 0.004 | 0.010 | 0.050 | 0.200 | 0.550 | 0.750 | 0.800 |
|---|---|---|---|---|---|---|---|---|
| Hardness (Hv) | 42.8 | 43.0 | 43.0 | 43.2 | 43.3 | 43.2 | 43.1 | — |
| Loss by Corrosion | 8.33 | 5.16 | 2.75 | 1.97 | 1.77 | 1.37 | 0.99 | — |
| Workability | O | O | O | O | O | O/△ | △ | X |
|  | \| | | ← Practical Range → | | | | \| | |

TEST EXAMPLE 7

X wt % of Ti and 0.20 wt % of In were added to pure zinc.

Hot rolling temperature: 350° C.

Relationship among added amount (wt %), hardness (Hv), loss by corrosion (mg/cm$^2$), and rolling workability is shown.

| In (wt %) | 0.000 | 0.001 | 0.004 | 0.010 | 0.050 | 0.200 | 0.250 | 0.400 |
|---|---|---|---|---|---|---|---|---|
| Hardness (Hv) | — | 41.3 | 41.4 | 42.8 | 43.3 | 44.2 | 45.7 | 46.1 |
| Loss by Corrosion | — | 1.35 | 1.51 | 1.62 | 1.77 | 4.65 | 6.02 | 8.51 |
| Workability | X | O/△ | O/△ | O | O | O | O | O |
|  |  | \| | | ← Practical Range → | | | | \| |

As clearly seen from test examples 6 and 7, an increase of the hot rolling temperature from the conventional value (200°–250° C.) enabled addition of 0.004–0.75 wt % of In and 0.001–0.25 wt % of Ti, and manufacture of zinc cans for manganese dry batteries with improved hardness, loss by corrosion, and workability.

TEST EXAMPLE 8

0.75 wt % of In and 0.05 wt % of Ti were added to pure zinc. X wt % of Al was further added.

Hot rolling temperature: 250° C.

Relationship among added amount (wt %), hardness (Hv), loss by corrosion (mg/cm$^2$), and rolling workability is shown.

| Al (wt %) | 0.0000 | 0.0005 | 0.0100 | 0.0500 | 0.1500 | 0.2000 | 0.3000 |
|---|---|---|---|---|---|---|---|
| Hardness (Hv) | — | 50.3 | 50.4 | 50.3 | 50.1 | 50.2 | 50.3 |
| Loss by Corrosion | — | 0.83 | 0.97 | 1.01 | 2.12 | 4.98 | 8.01 |

-continued

| Al (wt %) | 0.0000 | 0.0005 | 0.0100 | 0.0500 | 0.1500 | 0.2000 | 0.3000 |
|---|---|---|---|---|---|---|---|
| Workability | X | Δ | Δ | Δ | O/Δ | O | O |
| | | | ← Practical Range → | | | | |

COMMENT ON TEST EXAMPLE 8

Corrosion resistance was improved by adding In. Ti was further added to prevent cracks at rolling. Moreover, the addition of Al enabled further reduction of loss by corrosion since it became possible to increase the amount of added In.

TEST EXAMPLE 9

X wt % of In and 0.05 wt % of Ti were added to pure zinc. 0.05 wt % of Al was further added.

Hot rolling temperature: 250° C.

Relationship among added amount (wt %), hardness (Hv), loss by corrosion (mg/cm$^2$), and rolling workability is shown.

| In (wt %) | 0.0000 | 0.0040 | 0.0100 | 0.0500 | 0.1000 | 0.5000 | 0.7500 | 0.8000 |
|---|---|---|---|---|---|---|---|---|
| Hardness (Hv) | 50.2 | 50.3 | 50.4 | 50.2 | 50.1 | 50.2 | 50.3 | — |
| Lose by Corrosion | 9.11 | 6.51 | 3.12 | 2.52 | 1.88 | 1.69 | 1.01 | — |
| Workability | O | O | O | O/Δ | O/Δ | O/Δ | Δ | X |
| | | | ← Practical Range → | | | | | |

COMMENT ON TEST EXAMPLE 9

Corrosion resistance was improved by adding In. Ti was further added to prevent cracks at rolling. Moreover, the addition of Al enabled further reduction of loss by corrosion since it became possible to increase the amount of added In.

TEST EXAMPLE 10

0.75 of In and 0.05 wt % of Ti were added to pure zinc. X wt % of Si was further added.

Hot rolling temperature: 250° C.

Relationship among added amount (wt %), hardness (Hv), loss by corrosion (mg/cm$^2$), and rolling workability is shown.

| Si (wt %) | 0.0000 | 0.0005 | 0.0100 | 0.0500 | 0.1500 | 0.2000 | 0.3000 |
|---|---|---|---|---|---|---|---|
| Hardness (Hv) | — | 50.5 | 50.6 | 50.5 | 50.4 | 50.5 | 50.3 |
| Loss by Corrosion | — | 0.72 | 0.74 | 0.99 | 2.12 | 4.98 | 8.01 |
| Workability | X | Δ | Δ | O/Δ | O | O | O |
| | | | ← Practical Range → | | | | |

COMMENT ON TEST EXAMPLE 10

Corrosion resistance was improved by adding In. Ti was further added to prevent cracks at rolling. Moreover, the addition of Si enabled further reduction of loss by corrosion since it became possible to increase the amount of added In.

TEST EXAMPLE 11

X wt % of In and 0.05 wt % of Ti were added to pure zinc. 0.05 wt % of Si was further added.

Hot rolling temperature: 250° C.

Relationship among added amount (wt %), hardness (Hv), loss by corrosion (mg/cm$^2$), and rolling workability is shown.

| In (wt. %) | 0.0000 | 0.0040 | 0.0100 | 0.0500 | 0.1000 | 0.5000 | 0.7500 | 0.8000 |
|---|---|---|---|---|---|---|---|---|
| Hardness (Hv) | 50.6 | 50.4 | 50.5 | 50.4 | 50.3 | 50.4 | 50.5 | — |
| Loss by Corrosion | 9.04 | 6.12 | 4.11 | 2.99 | 1.88 | 1.35 | 0.99 | — |
| Workability | ○ | ○ | ○ | ○/Δ | ○/Δ | ○/Δ | ○/Δ | Δ/X |
| | | | | ← Practical Range → | | | | |

COMMENT ON TEST EXAMPLE 11

Corrosion resistance was improved by adding In. Ti was further added to prevent cracks at rolling. Moreover, the addition of Si enabled further reduction of loss by corrosion since it became possible to increase the amount of added In.

TEST EXAMPLE 12

0.75 wt % of In and 0.05 wt % of Ti were added to pure zinc. X wt % of Ni was further added.

Hot rolling temperature: 250° C.

Relationship among added amount (wt %), hardness (Hv), loss by corrosion (mg/cm$^2$), and rolling workability is shown.

| Ni (wt %) | 0.0000 | 0.0010 | 0.0100 | 0.0500 | 0.2000 | 0.2500 | 0.4000 |
|---|---|---|---|---|---|---|---|
| Hardness (Hv) | — | 51.2 | 51.3 | 51.2 | 51.4 | 51.3 | 51.2 |
| Loss by Corrosion | — | 0.89 | 0.89 | 0.95 | 2.12 | 4.98 | 8.01 |
| Workability | X | Δ | Δ | ○/Δ | ○ | ○ | ○ |
| | | ← Practical Range → | | | | | |

COMMENT ON TEST EXAMPLE 12

Corrosion resistance was improved by adding In. Ti was further added to prevent cracks at rolling. Moreover, the addition of Ni enabled further reduction of loss by corrosion since it became possible to increase the amount of added In.

TEST EXAMPLE 13

X wt % of In and 0.05 wt % of Ti were added to pure zinc. 0.05 wt % of Ni was further added.

Hot rolling temperature: 250° C.

Relationship among added amount (wt %), hardness (Hv), loss by corrosion (mg/cm$^2$), and rolling workability is shown.

| In (wt %) | 0.0000 | 0.0040 | 0.0100 | 0.0500 | 0.1000 | 0.5000 | 0.7500 | 0.8000 |
|---|---|---|---|---|---|---|---|---|
| Hardness (Hv) | 51.3 | 51.4 | 51.3 | 51.3 | 51.2 | 51.4 | 51.2 | — |
| Loss by Corrosion | 9.11 | 6.66 | 3.98 | 2.51 | 1.99 | 1.67 | 0.95 | — |
| Workability | ○ | ○ | ○ | ○/Δ | ○/Δ | ○/Δ | ○/Δ | Δ/X |
| | | | | ← Practical Range → | | | | |

COMMENT ON TEST EXAMPLE 13

Corrosion resistance was improved by adding In. Ti was further added to prevent cracks at rolling. Moreover, the addition of Ni enabled further reduction loss by corrosion since it became possible to increase the amount of added In.

TEST EXAMPLE 14

0.050 wt % of In and X wt % of Zr were added to pure zinc.

Hot rolling temperature: 250° C.

Relationship among added amount (wt %), hardness (Hv), loss by corrosion (mg/cm$^2$), and rolling workability is shown.

| Zr (wt %) | 0.000 | 0.002 | 0.003 | 0.010 | 0.050 | 0.100 | 0.500 | 0.550 |
|---|---|---|---|---|---|---|---|---|
| Hardness (Hv) | — | — | 41.9 | 43.7 | 44.2 | 44.5 | 45.2 | 46.1 |
| Lose by Corrosion | — | — | 0.91 | 1.32 | 1.78 | 2.40 | 4.82 | 7.41 |
| Workability | X | Δ/X | Δ | ○/Δ | ○/Δ | ○/Δ | ○ | ○ |
| | | | | ← Practical Range → | | | | |

COMMENT ON TEST EXAMPLE 14

Addition of ZR enabled prevention of occurrence of cracks at rolling. Hardness was also improved. However, addition of ZR more than 0.500 wt % impaired corrosion resistance.

TEST EXAMPLE 15

0.050 wt % of Zr and X wt % of In were added to pure zinc.

Hot rolling temperature: 250° C.

Relationship among added amount (wt %), hardness (Hv), loss by corrosion (mg/cm$^2$), and rolling workability is shown.

| In (wt. %) | 0.003 | 0.004 | 0.010 | 0.050 | 0.100 | 0.200 | 0.500 | 0.550 |
|---|---|---|---|---|---|---|---|---|
| Hardness (Hv) | 44.3 | 44.5 | 44.1 | 44.2 | 44.6 | 44.3 | 44.5 | — |
| Lose by Corrosion | 7.04 | 5.92 | 3.09 | 1.78 | 1.16 | 0.92 | 0.81 | — |
| Workability | O | O | O | O/Δ | O/Δ | Δ | Δ | Δ/X |
|  |  |  | ← Practical Range → |  |  |  |  |  |

COMMENT ON TEST EXAMPLE 15

Addition of In significantly improved corrosion resistance. However, workability was lowered for occurrence of cracks at rolling when more than 0.500 wt % of In was added.

In the above test examples 14 and 15, the hot rolling temperature was a typical conventional value of 250° C. When the hot rolling temperature was raised from the conventional value, it was observed that workability was improved and the amount of In to be added could be further increased.

Based on the above knowledge, rolling was performed while rolling temperature was employed as a parameter, on condition that 0.20 wt % of ZR was added to pure zinc and an amount of In was varied within a range of 0.60–0.90 wt %. The results are shown in the following test examples 16–19.

TEST EXAMPLE 16

0.60 wt % of In and 0.20 wt % of Zr were added to pure zinc.

Relationship among rolling temperature (° C.), hardness (Hv), loss by corrosion (mg/cm$^2$), and rolling workability is shown.

| Rolling temperature (°C.) | 200 | 250 | 270 | 300 | 350 | 370 | 400 |
|---|---|---|---|---|---|---|---|
| Hardness (Hv) | — | — | 44.6 | 44.7 | 44.7 | 44.8 | — |
| Loss by Corrosion | — | — | 0.94 | 0.93 | 0.92 | 0.92 | — |
| Workability | Δ/X | Δ/X | Δ | O | O | O/Δ | X |
|  |  |  |  | ← Practical Range → |  |  |  |

TEST EXAMPLE 17

0.70 wt % of In and 0.20 wt % of Zr were added to pure zinc.

Relationship among rolling temperature (° C.), hardness (HV), loss by corrosion (mg/cm$^2$), and rolling workability is shown.

| Rolling temperature (°C.) | 200 | 250 | 270 | 300 | 350 | 370 | 400 |
|---|---|---|---|---|---|---|---|
| Hardness (Hv) | — | — | 44.7 | 44.8 | 44.7 | 44.8 | — |
| Loss by Corrosion | — | — | 0.91 | 0.88 | 0.86 | 0.86 | — |
| Workability | X | Δ/X | Δ | O/Δ | O | O/Δ | X |
|  |  |  |  | ← Practical Range → |  |  |  |

TEST EXAMPLE 18

0.80 wt % of In and 0.20 wt % of Zr were added to pure zinc.

Relationship among rolling temperature (° C.), hardness (Hv), loss by corrosion (mg/cm$^2$), and rolling temperature is shown.

| Rolling temperature (°C.) | 200 | 250 | 270 | 300 | 350 | 370 | 400 |
|---|---|---|---|---|---|---|---|
| Hardness (Hv) | — | — | 44.3 | 44.3 | 44.4 | 44.6 | — |
| Loss by Corrosion | — | — | 0.83 | 0.82 | 0.80 | 0.80 | — |
| Workability | X | X | Δ | Δ | O/Δ | Δ | X |
|  |  |  |  | ← Practical Range → |  |  |  |

TEST EXAMPLE 19

0.90 wt % of In and 0.20 wt % of Zr were added to pure zinc.

Relationship among rolling temperature (° C.), hardness (Hv), loss by corrosion (mg/cm$^2$), and rolling workability is shown.

| Rolling temperature (°C.) | 200 | 250 | 270 | 300 | 350 | 370 | 400 |
|---|---|---|---|---|---|---|---|
| Hardness (Hv) | — | — | — | — | — | — | — |
| Loss by Corrosion | — | — | — | — | — | — | — |
| Workability | X | X | X | X | X | X | X |

As is apparent from the above test examples 16–19, the maximum added amount of In was 0.50 wt % (see test example 15) at the hot rolling temperature of 250° C. However, when the hot rolling temperature was set between 270° C.–370° C., an amount of added In up to 0.80 wt % was practically effective for all the factors of workability, hardness, loss by corrosion.

The above test examples 16–19 show the results of tests in which 0.20 wt % of Zr was added and the amount of In was varied between 0.60–0.90 wt % where the hot rolling temperature was higher than the conventional values. The following test examples 20 and 21 show test results at a hot rolling temperature of 350° C. for various In amounts below 0.80 wt % and for various added amounts of Zr.

TEST EXAMPLE 20

X wt % of In and 0.05 wt % of Zr were added to pure zinc.
Hot rolling temperature: 350° C.

Relationship among added amount (wt %), hardness (Hv), loss by corrosion (mg/cm$^2$), and rolling workability is shown.

| In (wt %) | 0.003 | 0.004 | 0.010 | 0.050 | 0.200 | 0.500 | 0.800 | 0.850 |
|---|---|---|---|---|---|---|---|---|
| Hardness (Hv) | 42.8 | 43.0 | 43.0 | 43.7 | 44.5 | 44.7 | 44.4 | — |
| Loss by Corrosion | 8.33 | 5.16 | 2.75 | 1.78 | 0.94 | 0.83 | 0.75 | — |
| Workability | ○ | ○ | ○ | ○ | ○ | ○/△ | △ | △/X |
|  | l | ← | Practical | Range | → | | l | |

TEST EXAMPLE 21

X wt % of Zr and 0.050 wt % of In were added to pure zinc.

Hot rolling temperature: 350° C.

Relationship among added amount (wt %), hardness (Hv), loss by corrosion (mg/cm$^2$), and rolling workability is shown.

| Zr (wt %) | 0.001 | 0.002 | 0.003 | 0.010 | 0.050 | 0.100 | 0.500 | 0.550 |
|---|---|---|---|---|---|---|---|---|
| Hardness (Hv) | — | 40.8 | 41.6 | 43.3 | 43.7 | 44.0 | 44.6 | 45.3 |
| Loss by Corrosion | — | 0.78 | 0.95 | 1.29 | 1.78 | 2.35 | 4.60 | 7.24 |
| Workability | △/X | △ | ○/△ | ○/△ | ○ | ○ | ○ | ○ |
|  | l | ← | Practical | Range | → | | l | |

As clearly seen from the test examples 20 and 21, increase of hot rolling temperature from the conventional value (200°–250°) enabled addition of 0.004–080 wt % of In and 0.002–0.50 wt % Zr, and manufacture of zinc cans for manganese dry batteries with improved hardness, loss by corrosion, and workability.

TEST EXAMPLE 22

0.800 wt % of In and 0.050 wt % of Zr were added to pure zinc. X wt % of Al was further added.

Hot rolling temperature: 250° C.

Relationship among added amount (wt %), hardness (Hv), loss by corrosion (mg/cm$^2$), and rolling workability is shown.

| Al (wt %) | 0.000 | 0.001 | 0.005 | 0.010 | 0.050 | 0.100 | 0.150 | 0.200 |
|---|---|---|---|---|---|---|---|---|
| Hardness (Hv) | — | 44.8 | 45.4 | 46.6 | 46.9 | 47.5 | 48.2 | 48.6 |
| Loss by Corrosion | — | 0.76 | 0.73 | 0.65 | 0.61 | 1.11 | 5.94 | 7.11 |
| Workability | X | △ | △ | ○/△ | ○/△ | ○ | ○ | ○ |
|  | l | ← | Practical | Range | → | | l | |

COMMENT ON TEST EXAMPLE 22

Addition of Al prevented cracks at rolling even at an increased range of added In. Hardness was also improved. However, addition more than 0.150 wt % lowered corrosion resistance.

TEST EXAMPLE 23

X wt % of In and 0.050 wt % of Zr were added to pure zinc. 0.050 wt % of Al was further added.

Hot rolling temperature: 250° C.

Relationship among added amount (wt %), hardness (Hv), loss by corrosion (mg/cm$^2$), and rolling workability is shown.

| In (wt %) | 0.003 | 0.004 | 0.010 | 0.050 | 0.100 | 0.500 | 0.800 | 0.850 |
|---|---|---|---|---|---|---|---|---|
| Hardness (Hv) | 46.1 | 46.3 | 46.4 | 46.3 | 46.6 | 46.8 | 46.9 | — |
| Lose by Corrosion | 7.10 | 6.24 | 3.13 | 1.92 | 1.23 | 0.97 | 0.61 | — |
| Workability | ○ | ○ | ○ | ○ | ○/△ | ○/△ | ○/△ | △/X |
|  | l | ← | Practical | Range | → | | l | |

COMMENT ON TEST EXAMPLE 23

Addition of Al prevented cracks at rolling even at an increased range of added In. Rolling was enabled up to an amount of In of 0.800 wt %, and corrosion resistance was also improved.

TEST EXAMPLE 24

0.800 wt % of In and 0.050 wt % of Zr were added to pure zinc. X wt % of Si was further added.

Hot rolling temperature: 250° C.

Relationship among added amount (wt %), hardness (Hv), loss by corrosion (mg/cm$^2$), and rolling workability is shown.

| Si (wt %) | 0.000 | 0.001 | 0.005 | 0.010 | 0.050 | 0.100 | 0.200 | 0.250 |
|---|---|---|---|---|---|---|---|---|
| Hardness (Hv) | — | 44.5 | 44.3 | 44.3 | 44.5 | 44.3 | 44.4 | 44.6 |
| Loss by Corrosion | — | 0.75 | 0.64 | 0.59 | 0.71 | 3.52 | 6.81 | 7.21 |
| Workability | X | △ | △ | ○/△ | ○/△ | ○ | ○ | ○ |
|  | l | ← | Practical | Range | → | | l | |

COMMENT ON TEST EXAMPLE 24

Addition of Si prevented at rolling even at an increased range of added In. However, addition of more than 0.200 wt % lowered corrosion resistance.

TEST EXAMPLE 25

X wt % of In and 0.050 wt % of Zr were added to pure zinc.

0.050 wt % of Si was further added.

Hot rolling temperature: 250° C.

Relationship among added amount (wt %), hardness (Hv), loss by corrosion (mg/cm$^2$), and rolling workability is shown.

| In (wt %) | 0.003 | 0.004 | 0.010 | 0.050 | 0.100 | 0.500 | 0.800 | 0.850 |
|---|---|---|---|---|---|---|---|---|
| Hardness (Hv) | 44.1 | 44.3 | 44.2 | 44.4 | 44.4 | 44.7 | 44.5 | — |
| Loss by Corrosion | 7.11 | 5.91 | 3.00 | 1.57 | 1.14 | 0.91 | 0.71 | — |

-continued

| In (wt %) | 0.003 | 0.004 | 0.010 | 0.050 | 0.100 | 0.500 | 0.800 | 0.850 |
|---|---|---|---|---|---|---|---|---|
| Workability | O | O | O | O | O/Δ | O/Δ | O/Δ | Δ/X |
| | | | | ← Practical Range → | | | | |

COMMENT ON TEST EXAMPLE 25

Addition of Si prevented cracks at rolling even at an increased range of added In. Rolling was enabled up to an amount of added In of 0.800 wt %, and corrosion resistance was also improved.

TEST EXAMPLE 26

0.800 wt % of In and 0.050 wt % of Zr were added to pure zinc. X wt % of Ni was further added.

Hot rolling temperature: 250° C.

Relationship among added amount (wt %), hardness (Hv), loss by corrosion (mg/cm$^2$), and rolling workability is shown.

| Ni (wt %) | 0.000 | 0.001 | 0.002 | 0.010 | 0.050 | 0.100 | 0.270 | 0.300 |
|---|---|---|---|---|---|---|---|---|
| Hardness (Hv) | — | — | 44.6 | 44.7 | 44.4 | 44.3 | 44.5 | 44.7 |
| Loss by Corrosion | — | — | 0.81 | 0.76 | 0.68 | 1.01 | 5.96 | 7.32 |
| Workability | X | Δ/X | Δ | Δ | O/Δ | O/Δ | O | O |
| | | | | ← Practical Range → | | | | |

COMMENT ON TEST EXAMPLE 26

Addition of Ni prevented cracks at rolling even at an increased range of added In. However, addition of more than 0.270 wt % lowered corrosion resistance.

TEST EXAMPLE 27

X wt % of In and 0.050 wt % of Zr were added to pure zinc. 0.050 wt % of Ni was further added.

Hot rolling temperature: 250° C.

Relationship among added amount (wt %), hardness (Hv), loss by corrosion (mg/cm$^2$), and rolling workability is shown.

| In (wt %) | 0.003 | 0.004 | 0.010 | 0.050 | 0.100 | 0.500 | 0.800 | 0.850 |
|---|---|---|---|---|---|---|---|---|
| Hardness (Hv) | 44.4 | 44.6 | 44.8 | 44.4 | 44.7 | 44.6 | 44.4 | — |
| Loss by Corrosion | 7.09 | 6.01 | 2.98 | 1.51 | 0.97 | 0.89 | 0.68 | — |
| Workability | O | O | O | O | O/Δ | O/Δ | O/Δ | Δ/X |
| | | | | ← Practical Range → | | | | |

COMMENT ON TEST EXAMPLE 27

Addition of Ni prevented cracks at rolling even at an increased range of added In. Rolling was enabled up to an amount of added In of 0.800 wt %, and corrosion resistance was also improved.

Next, manganese dry battery according to the present invention will be described. In the aforementioned zinc anode can and the manufacturing method therefor according to the present invention, predetermined amounts of In and Ti or Zr were added to pure zinc in order to improve corrosion resistance and workability of a zinc can. In a manganese dry battery of the present invention, the zinc can has the above construction. Moreover, In was added to paste on a separate contacting the zinc can so as to further improve corrosion resistance of the zinc can. With the use of this configuration, In contained in the paste is transferred to the surface of the zinc can to perform a similar effect as does mercury and suppresses corrosion of the zinc can effectively.

The amount of added indium is set between 0.1 and 8.0 wt % for the paste applied to the separate. An expected effect may not be obtained if the amount is less than 0.1% or more than 8.0%.

Furthermore, a $ZnCl_2$ concentration in the electrolyte is set at 35–50 wt % to make the anti-corrosion action of the above indium effective promptly in the present invention. Thereby, starch in the paste of the separate is urged to swell and quickly stabilize the state of the interface of the zinc anode. At the same time, an amount corroded by self discharge during storage is suppressed. This enables rapid stabilization of an open-circuit voltage during assembly by quickly stabilizing the interface of the zinc anode.

Figure 2:
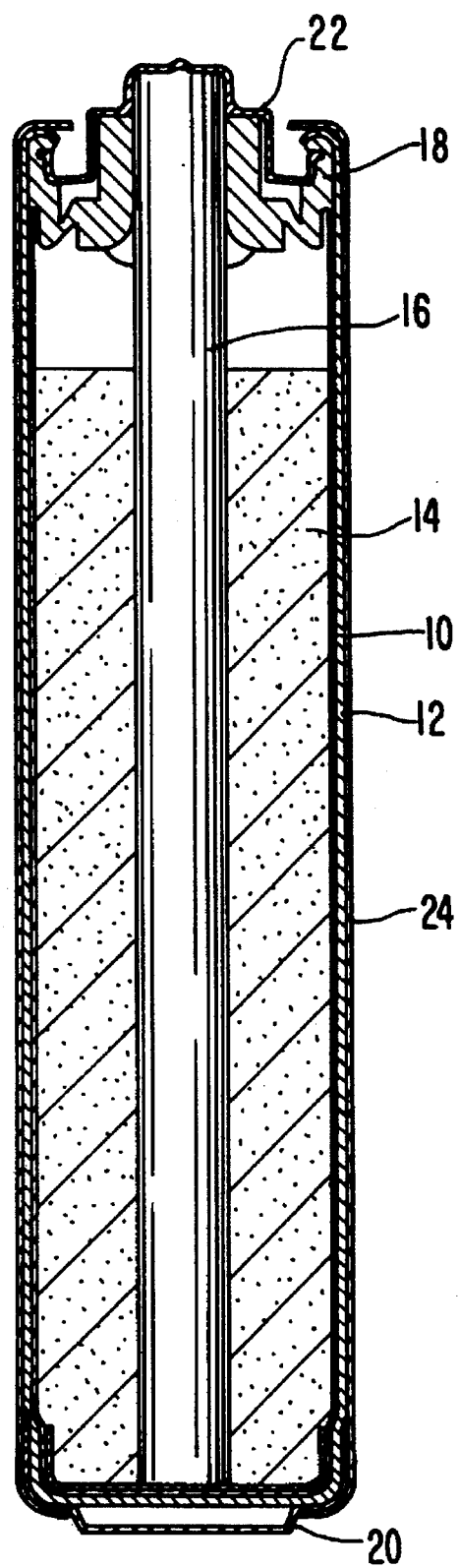
FIG. 2 is a longitudinal cross-sectional view of a manganese dry battery according to the present invention.

Referring to FIG. 2 showing an R03 type manganese dry battery, 10 is a separator, 12 is a zinc anode can with one end closed and 14 is a cathode mixture having manganese dioxide as an active substance. The cathode mixture 14 is filled in the zinc anode can 12 as surrounded by the separate 10, and a cathode carbon rod 16 is inserted into the center thereof. An opening of the zinc can 12 is sealed with a gasket 18. An anode terminal 20 is applied to a bottom surface of the zinc can 12 and a projecting tip end of the carbon rod 16 is covered with a cathode terminal 22. An outer surface of the zinc can 12 is covered with a shrink film label 24.

The cathode mixture was prepared through the steps of adding 2 part by weight of acetylene black to 10 parts by weight of electrolysis manganese dioxide, dry mixing the same, then adding and mixing the following respective electrolyte compositions.

For manufacturing the separator, 53 parts by weight of starch and others and 157 parts by weight of water and a small of salt were mixed with each other. Then a small amount of indium salt ($InCl_3$) was added thereto and coated to a base sheet to a weight of 30 g/m$^2$. The amount of indium salt to be added to the above mixture was varied among 0.1 wt % (Sample 1), 1.4 wt % (Sample 2), and 8.0 wt % (Sample 3). On the other hand, as comparative samples, 53 parts by weight of starch and others and 157 parts by weight of water and a small amount of salt were mixed with each other. No indium salt was added for a comparative sample 1, 0.05 wt % was added for a comparative sample 2, and 10.0 wt % was added for a comparative sample 3. The mixture was coated on a base sheet to a weight of 30 g/m$^2$.

Zinc cans of the following composition were tested. A first can includes a zinc base alloy comprising 0.009 wt % of indium and 0.024 wt % of Ti added to pure zinc as a typical substance in an In—Ti system. A second can includes a zinc base alloy comprising 0.015 wt % of indium and 0.007 wt % of zirconium added to pure zinc as a typical substance in an In—Zr system. A third can includes a zinc base alloy comprising 0.4 wt % of lead and 0.0005 wt % of magnesium of typical conventional composition.

Compositions of electrolyte in the cathode mixture include one sample of $ZnCl_2/NH_4Cl=27/3$ (wt %) according to a conventional composition, and other samples of $ZnCl_2/$ NH₂Cl=35/0 (wt %) and ZnCl₂/NH₄Cl=50/0 (wt %) of the present invention.

Table 1 shows test results of discharge capacity, loss by corrosion and so on for various combinations of the separators, zinc cans, and cathode mixtures.

TABLE 1

| Zinc Can Composition | Separator | Electrolyte Composition in Cathode | | 15 Ω Continuous Discharge | Pulse Discharge (Cycle) | 15 Ω Continuous Discharge After 20 days Storage at 60° C. (min) | Loss by Corrosion during one month at 45° C. |
|---|---|---|---|---|---|---|---|
| | | $ZnCl_2$ | $NH_4Cl$ | EPV = 0.9V | EPV = 1.0V | EPV = 0.9V | (mg/cm²) |
| In: 0.009 Ti: 0.024 wt % | Comparative Sample 1 | 27 wt % | 3 wt % | 240 | 1100 | 180 | 6.9 |
| | Comparative Sample 2 | | | 240 | 1100 | 185 | 6.5 |
| | Present Sample 1 | | | 245 | 1200 | 190 | 6.0 |
| | Present Sample 2 | | | 250 | 1300 | 195 | 4.5 |
| | Present Sample 3 | | | 245 | 1300 | 190 | 5.0 |
| | Comparative Sample 3 | | | 245 | 1300 | 190 | 5.2 |
| | Comparative Sample 1 | 35 wt % | 0 wt % | 240 | 1500 | 200 | 11.0 |
| | Comparative Sample 2 | | | 245 | 1500 | 200 | 9.0 |
| | Present Sample 1 | | | 250 | 1800 | 210 | 3.6 |
| | Present Sample 2 | | | 260 | 2500 | 220 | 3.5 |
| | Present Sample 3 | | | 250 | 2000 | 210 | 3.6 |
| | Comparative Sample 3 | | | 250 | 2000 | 210 | 3.6 |
| | Comparative Sample 1 | 50 wt % | 0 wt % | 220 | 1550 | 195 | 9.0 |
| | Comparative Sample 2 | | | 230 | 1600 | 200 | 7.0 |
| | Present Sample 1 | | | 250 | 1850 | 210 | 3.6 |
| | Present Sample 2 | | | 260 | 2350 | 215 | 3.6 |
| | Present Sample 3 | | | 245 | 2200 | 210 | 3.6 |
| | Comparative Sample 3 | | | 245 | 2200 | 210 | 3.6 |
| In: 0.015 Ti: 0.007 wt % | Comparative Sample 1 | 27 wt % | 3 wt % | 245 | 1150 | 200 | 6.3 |
| | Comparative Sample 2 | | | 245 | 1200 | 200 | 5.4 |
| | Present Sample 1 | | | 250 | 1250 | 205 | 3.6 |
| | Present Sample 2 | | | 255 | 1300 | 230 | 2.8 |
| | Present Sample 3 | | | 245 | 1250 | 215 | 3.2 |
| | Comparative Sample 3 | | | 245 | 1250 | 215 | 3.2 |
| | Comparative Sample 1 | 35 wt % | 0 wt % | 235 | 1500 | 200 | 8.3 |
| | Comparative Sample 2 | | | 235 | 1550 | 200 | 7.0 |
| | Present Sample 1 | | | 245 | 1800 | 220 | 3.5 |
| | Present Sample 2 | | | 260 | 2800 | 230 | 2.8 |
| | Present Sample 3 | | | 255 | 2500 | 220 | 3.6 |
| | Comparative Sample 3 | | | 255 | 2450 | 220 | 3.6 |
| | Comparative Sample 1 | 50 wt % | 0 wt % | 215 | 1550 | 190 | 10.0 |
| | Comparative Sample 2 | | | 220 | 1600 | 190 | 7.2 |
| | Present Sample 1 | | | 230 | 1850 | 210 | 3.6 |
| | Present Sample 2 | | | 260 | 2350 | 230 | 3.5 |
| | Present Sample 3 | | | 250 | 2350 | 230 | 3.6 |
| | Comparative Sample 3 | | | 250 | 2350 | 220 | 3.6 |
| Conventional Composition Pb: 0.4 Mg: 0.0005 wt % | Comparative Sample 1 | 27 wt % | 3 wt % | 250 | 1000 | 205 | 3.6 |

As is apparent from the above shown Table 1, samples 1–3 of the present invention with the separators to which 0.1–8.0 wt % of indium was added enabled significant decrease of loss by corrosion, compared with the comparative samples 1 and 2 employing the separators without addition of indium and to which 0.05 wt % of indium was added, respectively. Specifically, the samples of the present invention with the electrolyte containing 35–50 wt % of $ZnCl_2$ indicated a considerably greater decrease of corrosion. On the other hand, the comparative sample 3 to which 10.0 25% of indium was added shows no difference from the sample 3 of the present invention, and may not be economical in view of the increase of the additional amount of indium.

Compared with the conventional batteries having zinc cans including lead, in the batteries employing separators of the present samples 1–3 and electrolyte comprising 35–50 wt % of $ZnCl_2$, loss by corrosion was equivalent to or less than that of conventional batteries, discharge capacity after 20 days storage at 60° C. was greater than that of conventional batteries, and pulse discharge cycle was 1.8 times as long as that of conventional batteries. Furthermore, 15Ω continuous discharge capacity of most of the present samples were larger than those of conventional batteries, while some of the present samples showed worse results.

As described above in detail, according to the present invention, it is possible to produce zinc anode cans with characteristics equivalent to or superior to convention zinc anode cans to which lead is added, by abolishing the addition to zinc of harmful substances, such as mercury, cadmium and lead, and instead by adding such safe metals as indium, titanium or zirconium, or further adding nickel, aluminum or silicon in the above-mentioned combinations and proportions.

Moreover, according to the manganese dry batters of the present invention, without adding harmful substances, loss by corrosion during storage is suppressed, and at the same time operation over a long term and pulse discharge cycle can be improved. Thus, stabilization during assembly is promoted and productivity of manganese dry batteries is improved.

We claim:

1. An anode can shaped suitably to be used as an anode of a battery and to contain an electrolyte of the battery, said can being formed of a zinc base alloy including 0.004–0.75 wt % of indium and 0.001–0.25 wt % of titanium, without containing mercury, cadmium or lead.

2. An anode can as claimed in claim 1, wherein said zinc base alloy further includes 0.001–0.25 wt % of nickel.

3. An anode can as claimed in claim 1, wherein said zinc base alloy further includes 0.005–0.20 wt % of aluminum or silicon.

4. An anode can shaped suitably to be used as an anode of a battery and to contain an electrolyte of the battery, said can being formed of a zinc base alloy including 0.004–0.800 wt % of indium and 0.002–0.500 wt % of zirconium, without containing mercury, cadmium or lead.

5. An anode can as claimed in claim 4, wherein said zinc base alloy further includes 0.001–0.150 wt % of aluminum.

6. An anode can as claimed in claim 4, wherein said zinc base alloy further includes 0.001–0.200 wt % of silicon.

7. An anode can as claimed in claim 4, wherein said zinc base alloy further includes 0.002–0.270 wt % of nickel.

8. A method of manufacturing an anode can suitable for use as an anode of a dry battery and to contain an electrolyte of the battery, said method comprising:

forming a zinc material by melting a zinc base alloy including pure zinc to which are added 0.004–0.75 wt % of indium and 0.001–0.25 wt % of titanium, without containing mercury, cadmium or lead;

casting said zinc material;

hot rolling the thus cast zinc material within a temperature range of 270°–370° C.;

punching the thus rolled zinc material to form a pellet; and impact extruding said pellet to form said anode can.

9. A method of manufacturing an anode can suitable for use as an anode of a dry battery and to contain an electrolyte of the battery, said method comprising:

forming a zinc material by melting a zinc base alloy including pure zinc to which are added 0.004–0.800 wt % of indium and 0.002–0.500 wt % of zirconium, without containing mercury, cadmium or lead;

casting said zinc material;

hot rolling the thus cast zinc material within a temperature range of 270°–370° C.;

punching the thus rolled zinc material to form a pellet; and impact extruding said pellet to form said anode can.

10. A manganese dry battery comprising:

a can-shaped anode formed of a zinc base alloy including 0.004–0.75 wt % of indium and 0.001–0.25 wt % of titanium or 0.002–0.500 wt % of zirconium, without containing mercury, cadmium or lead;

a separator disposed on an inner surface of said anode can, said separator being coated with a past including 0.1–8 wt % of $InCl_3$;

a cathode mixture filling an interior of said separator, said cathode mixture including conductive carbonaceous material and electrolyte having a $ZnCl_2$ concentration of 35–50 wt %; and a carbon rod collector inserted into a center of said cathode mixture.

11. A manganese dry battery as claimed in claim 10, wherein said carbonaceous material comprises manganese dioxide.

12. A manganese dry battery as claimed in claim 10, wherein said carbonaceous material comprises acetylene block.

* * * * *